United States Patent
Susnjara (12)

(10) Patent No.: US 6,480,757 B1
(45) Date of Patent: Nov. 12, 2002

(54) METHOD OF LOCATING A WORKPIECE ON A COMPUTER NUMERIC CONTROLLED MACHINING SYSTEM

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 09/505,728

(22) Filed: Feb. 17, 2000

(51) Int. Cl.⁷ .............................................. G06F 19/00
(52) U.S. Cl. .............................. 700/159; 451/5; 451/8; 451/9; 451/10; 451/11; 702/94; 702/95; 702/158; 409/144; 409/218; 409/220
(58) Field of Search .......................... 700/86, 195, 186, 700/42, 55–56, 150; 82/15, 93; 702/94–95, 158, 150–151; 409/144, 218, 220; 451/5, 8–11

(56) References Cited

U.S. PATENT DOCUMENTS

| | | | | |
|---|---|---|---|---|
| 5,291,393 A | * | 3/1994 | Matsumoto et al. | 700/86 |
| 5,493,767 A | * | 2/1996 | Susnjara | 144/135 |
| 5,730,643 A | * | 3/1998 | Bartlett et al. | 451/8 |
| 6,022,132 A | * | 2/2000 | Schulz | 700/186 |
| 6,076,953 A | * | 6/2000 | Oakley | 700/195 |

* cited by examiner

*Primary Examiner*—Thomas Black
*Assistant Examiner*—Luke T. Huynh
(74) *Attorney, Agent, or Firm*—Stevens, Davis, Miller & Mosher, LLP

(57) ABSTRACT

This invention converts a toolhead of a computer numerical controlled machine into a locating fence by installing a fence guard on the toolhead. Since there is an indexing program in a computer numerical controlled machine to monitor a real time location of a spindle relative to a worktable, the true location of the locating fence can be easily obtained by adding an offset value indicative of the characteristic of the fence guard to numerical data indicative of the real time location of the spindle.

33 Claims, 10 Drawing Sheets

METHOD OF LOCATING A WORKPIECE ON A COMPUTER NUMERIC CONTROLLED MACHINING SYSTEM

FIELD OF THE INVENTION

The present invention is a method for locating a workpiece on a computer numeric controlled machining system.

BACKGROUND OF THE INVENTION

A conventional locating fence of a machine is generally fitted with a plurality of dowel pins, which dowel pins are insertable into any one of several pairs of equally spaced holes that are drilled into a worktable at various locations. The accommodation of selective placement of the locating fence permits flexible positioning of different workpieces for various types of cutting, drilling, sanding and the like. This type of locating fence arrangement is representative of those commonly used in the industry.

The aforementioned locating fence has many disadvantages. First, a considerable amount of time is required to manually change the position of the fence, which frustrates the high-speed automation objective of CNC machinery. Second, the locating fence is restricted to a few locations. Consequently, the locating fence is inflexible to meet the demands of workpieces of various dimensions.

Third, the customary method of workpiece indexing requires fabricating a custom fixture for each workpiece so that the workpiece nests in a specific location on the worktable. Another customary method is to utilize open-ended vice type clamps, or vacuum chucks which afford a considerable degree of utility but require the insertion of movable locating fences, which are placed at fixed points on the worktable in various locations for indexing. Both of the aforementioned methods serve the purpose of effective workpiece indexing. The disadvantages of these methods include requiring a considerable amount of time and resources to fabricate required fixtures, as well as having to spend time to manually relocate the fences.

SUMMARY OF THE INVENTION

The first object of the present invention is to provide a method for locating a workpiece onto a worktable of a CNC machining system without the need for custom fixtures, stop blocks, or the like.

The second object of the present invention is to provide a method for locating a workpiece onto the worktable of a CNC machining system, which substantially reduces setup time for changing the workpiece indexing location.

The third object of the present invention is to provide a method for locating a workpiece onto a worktable of a CNC machining system, utilizing the automation aspect of the CNC machining system.

The fourth object of the present invention is to provide a method for locating a workpiece onto a worktable of a CNC machining system, which results in an economic advantage over customary methods.

The fifth object of the present invention is to integrate placement of a locating fence into a machining program.

The sixth object of the present invention is to have a locating fence that is moveable anywhere within a perimeter of a worktable.

The seventh object of the present invention is to have a locating fence that is moveable outside a perimeter of a worktable to provide a reference point for either an extra large or an extra long workpiece.

The eighth object of the present invention is to have a computer program to constantly monitor a movement of a locating fence.

The ninth object of the present invention is to covert a toolhead of a CNC machine into a locating fence.

DETAIL DESCRIPTION OF THE INVENTION

Figure 1:
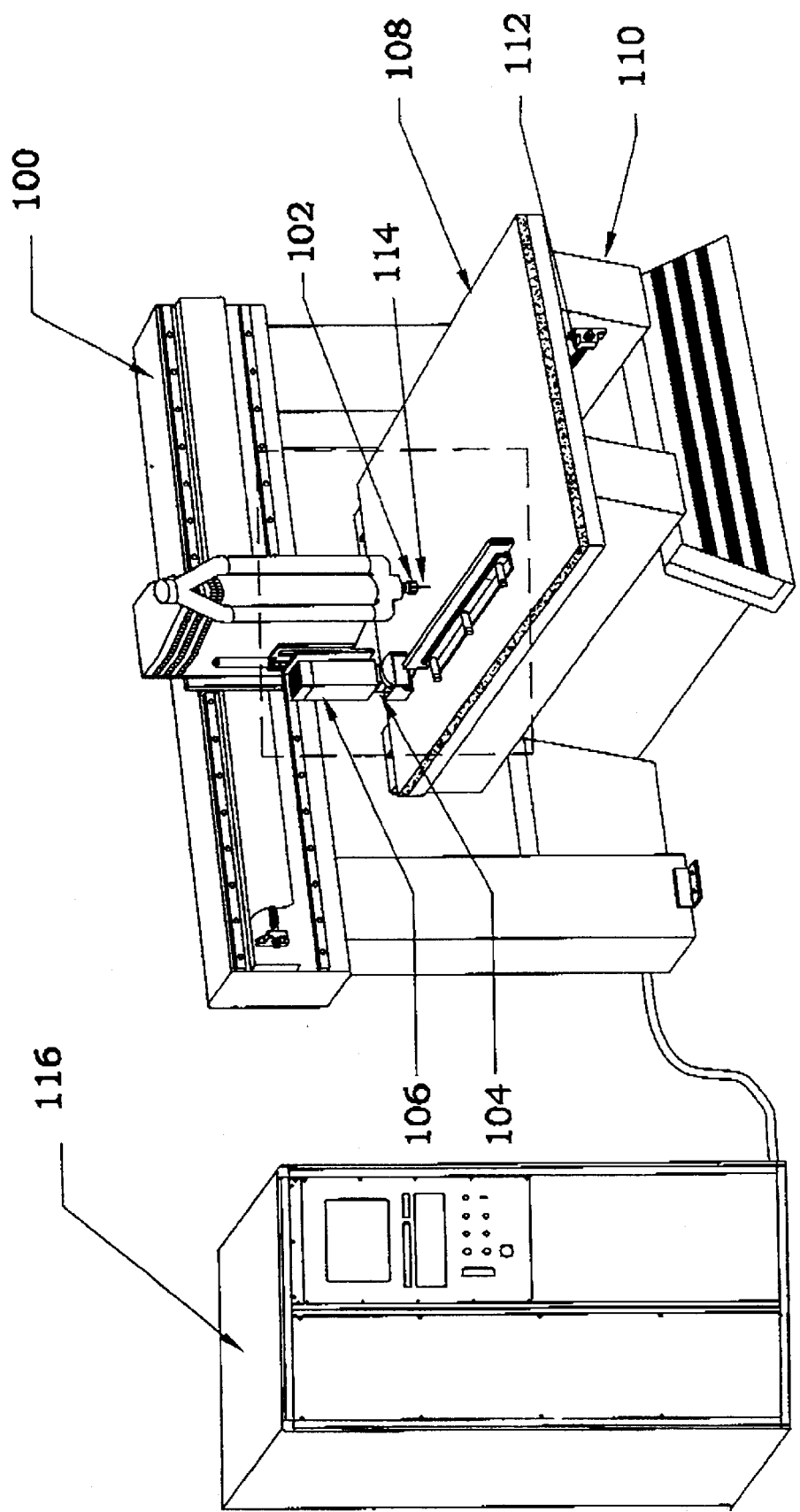
FIG. 1 illustrates a perspective view of a CNC machining system with a mechanical clamping fixture, utilizing a programmable indexing fence, which also serves as a blade guard, installed on the workhead of the same CNC machining system.

A Computer numeric controlled machining system 100 is shown in FIG. 1, hereinafter referred to as a CNC machining system. The CNC machining system has one or more electric or pneumatic spindles 102 and 104, disposed on a plurality of toolheads 106 and 107 that are displaceable along the x, y and z axes. A worktable 108, the surface of which being parallel to the x-y plane, is mounted below the plurality of toolheads 106 and 107, to a base section 110. Underneath the base section 110 is a plurality of feedscrew mechanisms 112 to move the worktable 108 along the Y-axis. A controller 116 is connected to the CNC machining system 100. As shown, a workpiece 35 is mounted to the worktable 108 to receive work functions such as routing, shaping, drilling and the like.

When performing machining operations on a workpiece with a CNC Machining system, such as drilling a hole, routing a mortise, or the like, it is often necessary to accurately position the workpiece 35 on the worktable 108, so as to insure that the operation is performed in the exact desired location.

Figure 2:
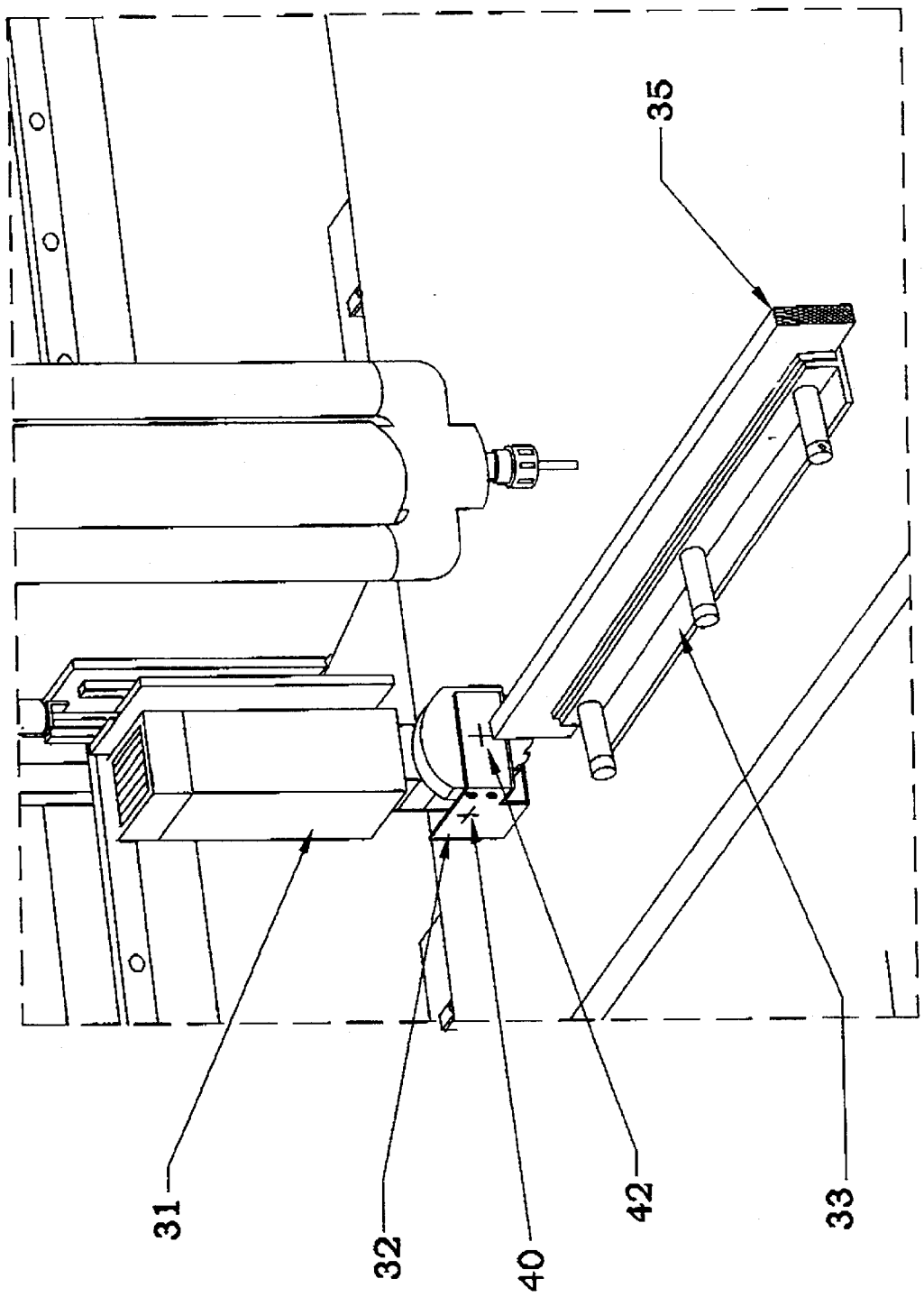
FIG. 2 illustrates a magnified view of the outlined area of FIG. 1.
Figure 3A:
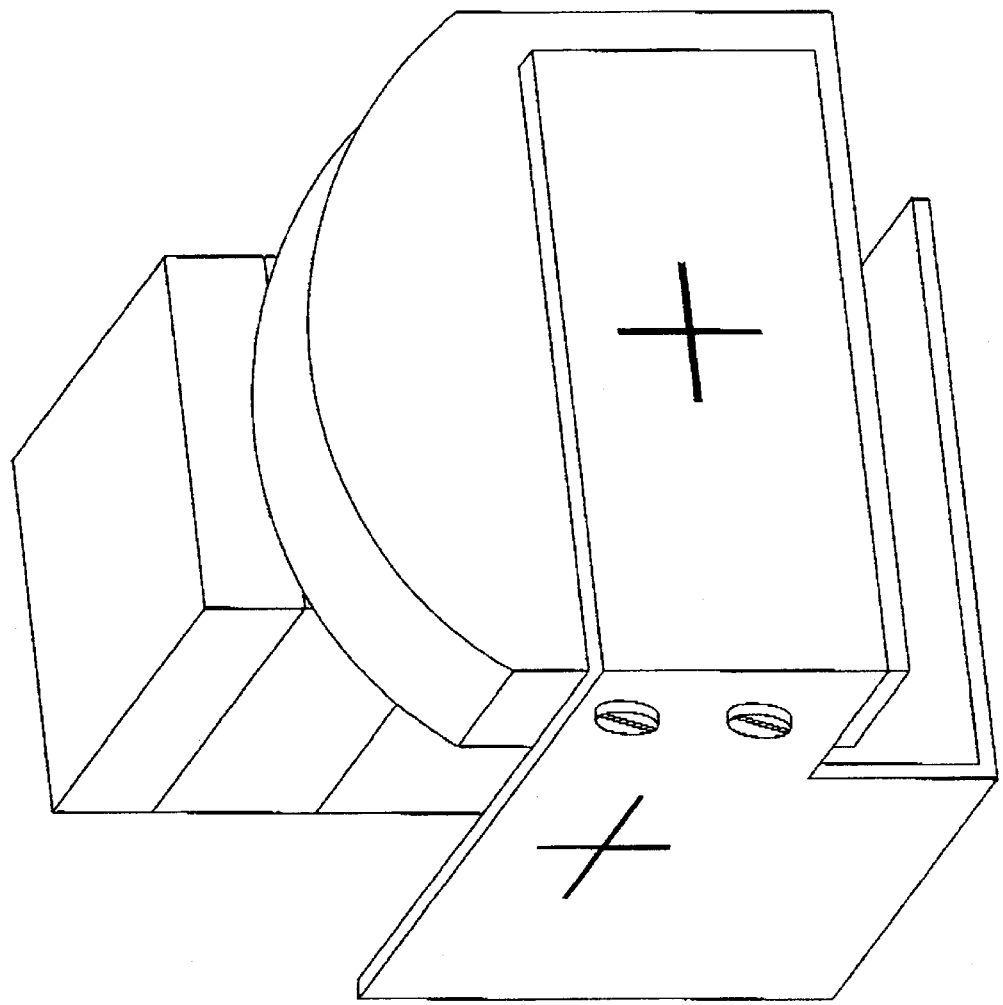
FIG. 3A illustrates a three dimensional view of a locating fence.
Figure 3B:
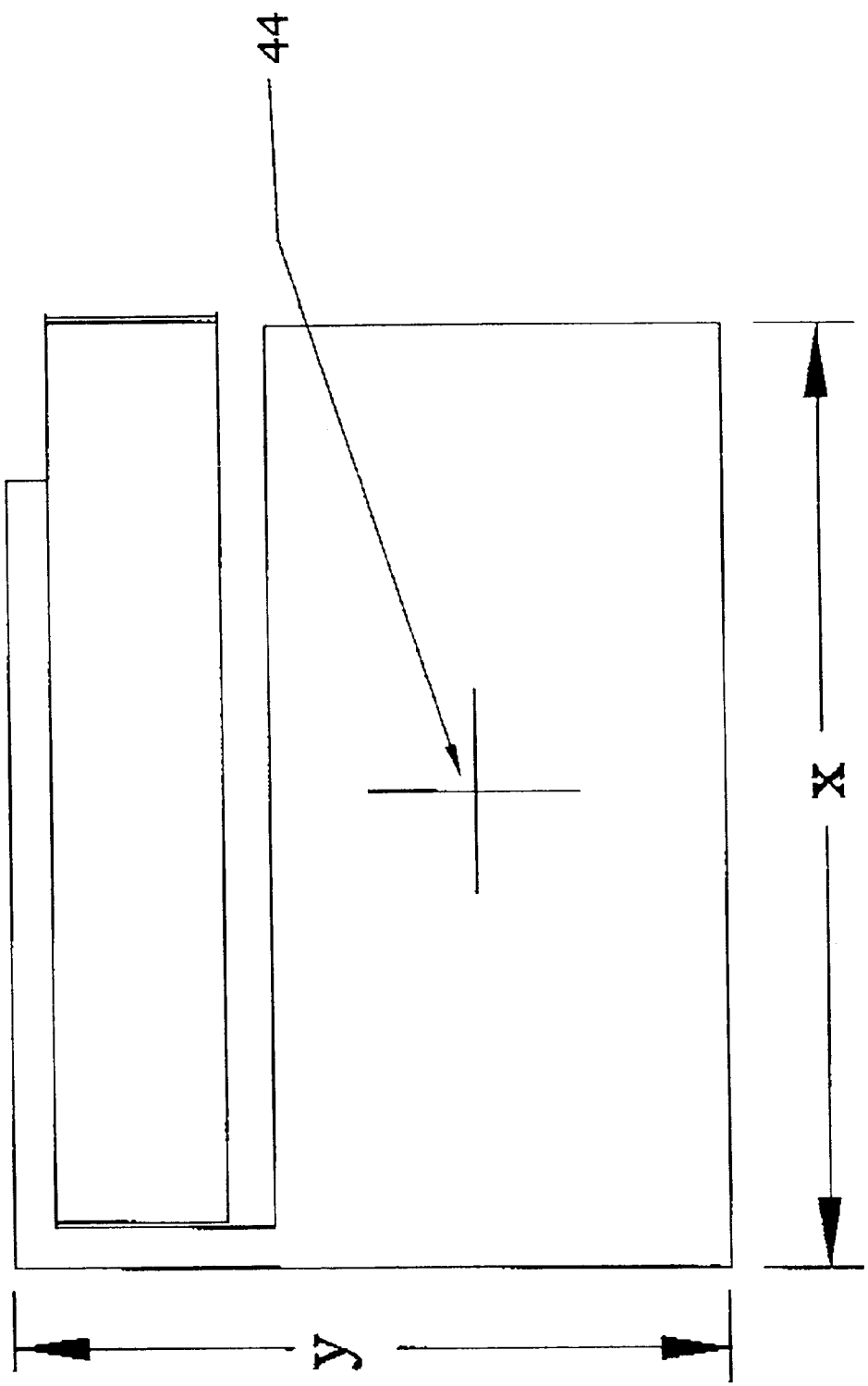
FIG. 3B illustrates a bottom view of the locating fence in FIG. 3A.

Referring to FIGS. 2, 3A and 3B, a mechanical clamp style workpiece holding fixture 33 is shown. A workpiece locating fence 32, which also serves as a blade guard, is mounted to the workhead, 106 of the CNC machining system. The locating fence 32 is made of a rigid construction and may be removed and replaced with no significant loss of accuracy. There are three distinct calibration marks 40, 42 and 44 on the locating fence, along the X-axis, Y-axis and Z-axis, respectively. These marks are precisely aligned to a centerline of the spindle where the locating fence is installed closest on. Once the locating fence 32 is mounted on the toolhead 106, which toolhead is displaceable along the z axis by means of a pneumatic actuator, the operation of which is automatically controllable by the CNC controller 116. The CNC controller 116 allows the locating fence 32 to be extended for use when needed, and retracted for storage when not needed. With different models of computer numerical controlled machines, such as Thermwood models 53, 42, 40, 40-4×8, 67, 67DT and 70, the locating fence 32 can be moved along the x, y and z axes. Manuals of these computer numerical controlled machines are incorporated herein by reference.

The aforementioned actuator also serves the function of lowering the toolhead for utilizing the tool installed thereon. The locating fence can be programmed to move into position relative to the workpiece by programming the necessary x, y, and z coordinate data into the controller 116 of the CNC machining system. The data for positioning the workpiece locating fence 32 can be incorporated into the workpiece processing program, based on the requirements of the workpiece being processed; however, the positioning of the locating fence 32 may also be placed under the control of a machine operator.

The locating fence shown in FIGS. 3A and 3B is a three-dimensional locating fence providing reference points along x, y and z axes (the z-axis is shown coming out of the page by the direction arrow dot). Depending upon the need of a machining operation, unidirectional locating fences can also be used. For instance, assuming a sawing operation is needed, a locating fence only providing a reference point in x-axis could be installed, so that a saw would not be obstructed to perform any sawing operation.

Figure 4:
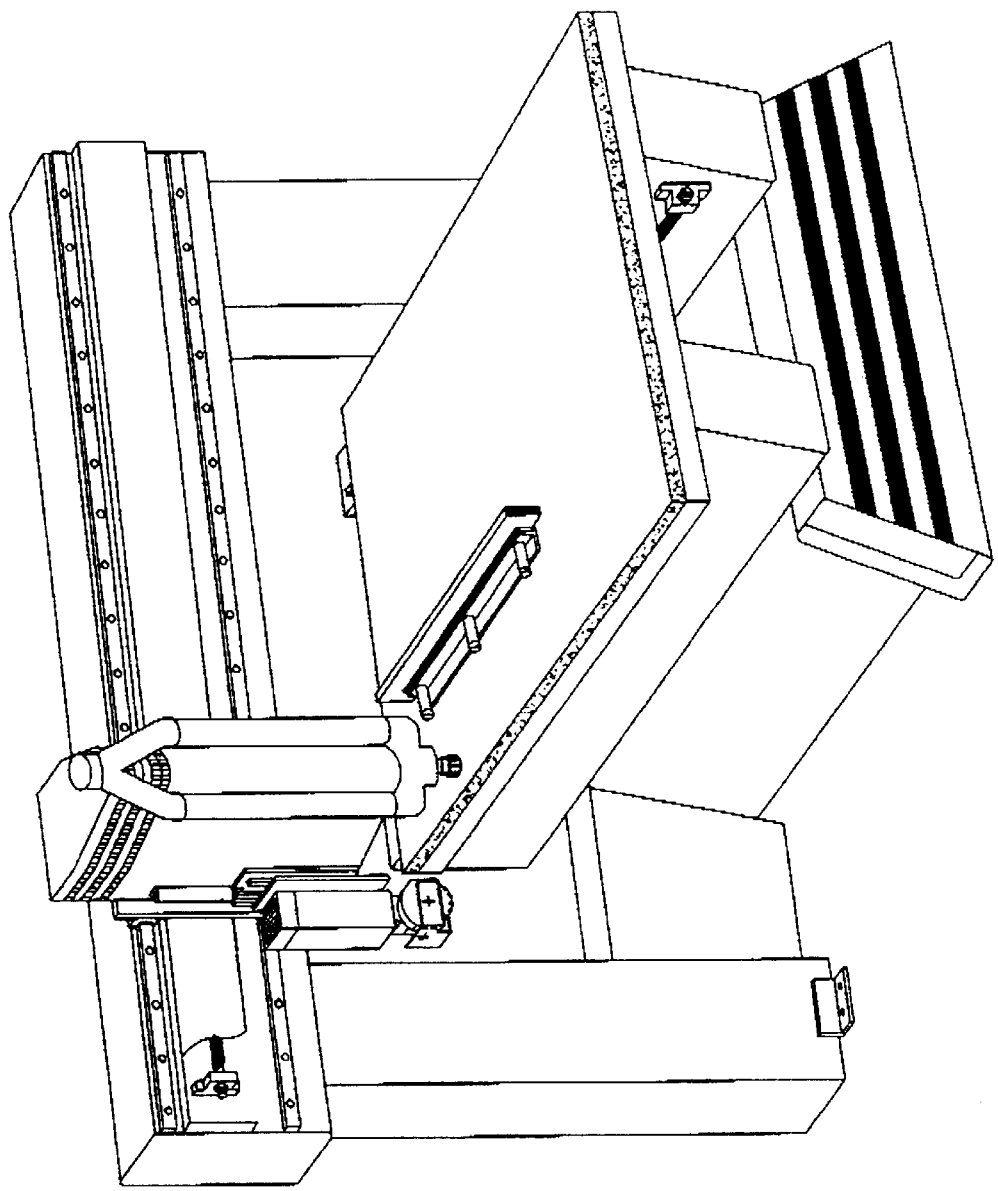
FIG. 4 illustrates a locating fence being placed outside a perimeter of a worktable.
Figure 5:
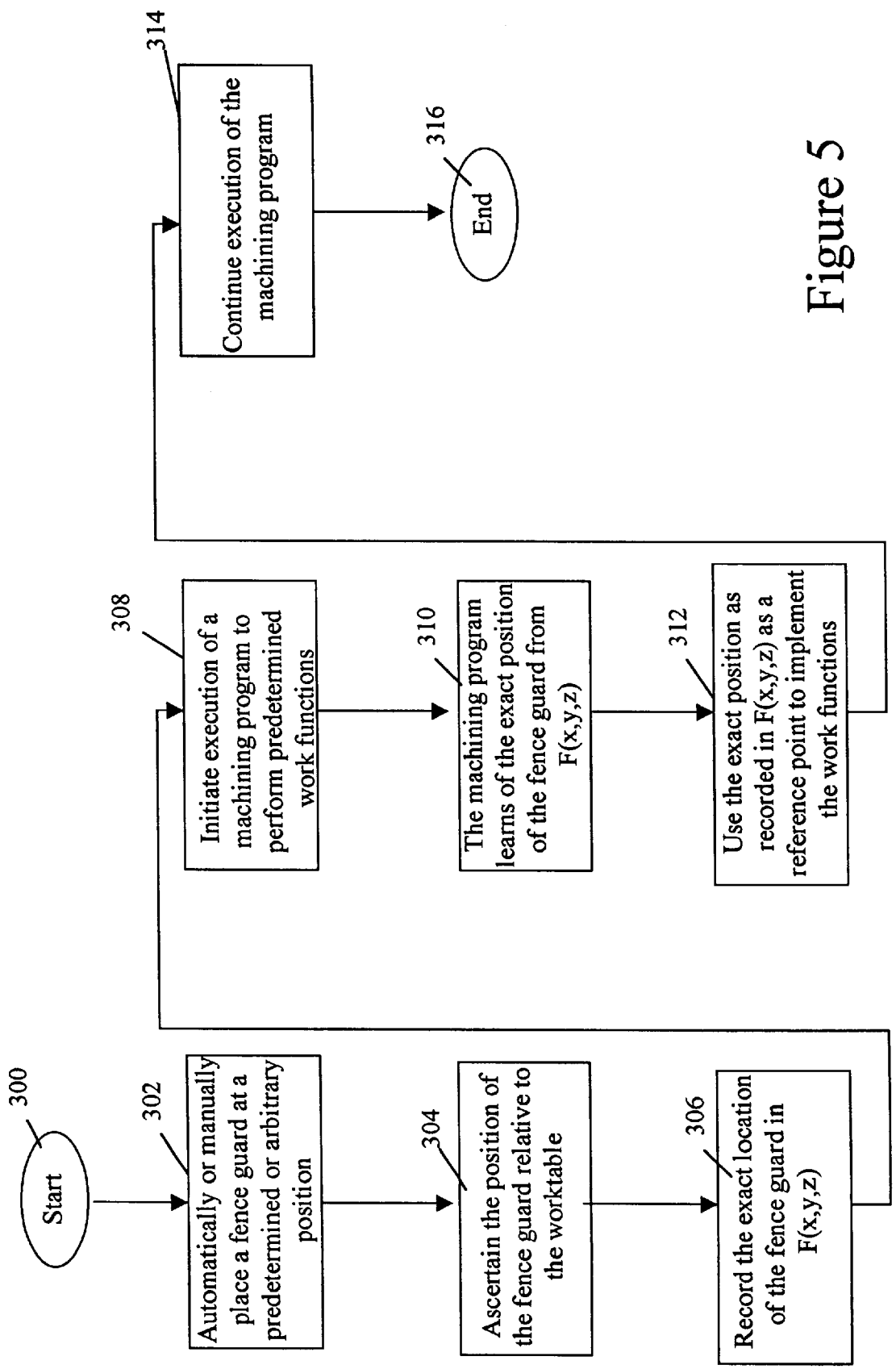
FIG. 5 illustrates a flow chart for one embodiment of the present invention.
Figure 6:
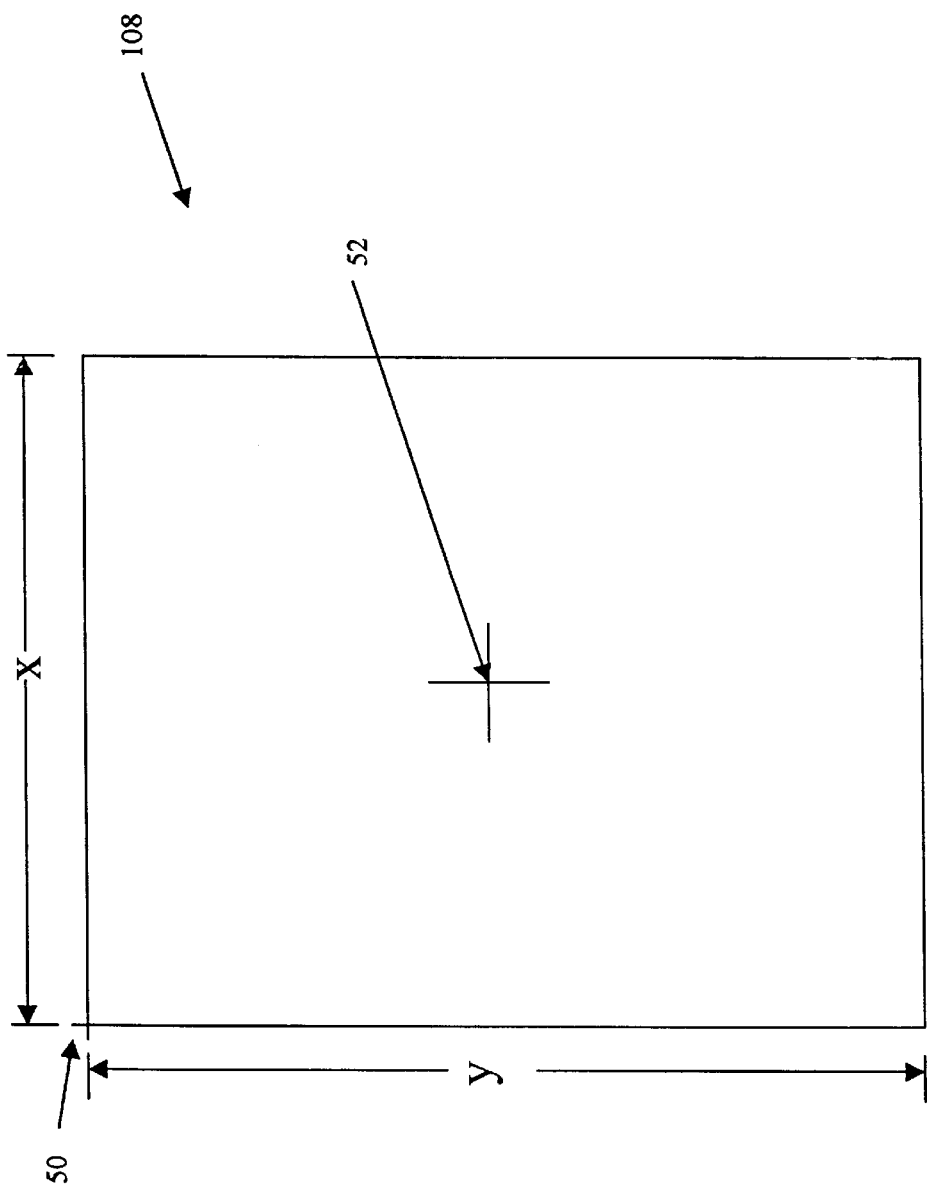
FIG. 6 illustrates a coordinate system for a worktable.

FIGS. 4, 5 and 6 illustrate by way of an example of the implementation of a machining program. First, either automatically or manually place a locating fence 32 at a predetermined or arbitrary position, as shown in step 302 of FIG. 4. Since the locating fence 32 is mounted on the toolhead 106, the controller 116 of the CNC machine utilizes an indexing program to monitor the exact location of a spindle mounted thereon, which in turn, is also able to determined the exact location of the locating fence 32 by adjusting with offset values reflective of the characteristics of the guard, as shown in step 304. This information is stored in F(x,y,z) as shown in step 306.

The exact location of the locating fence 32 is referenced relative to a coordinate system of the worktable 108, as shown in FIG. 5. As illustrated, there are two examples of coordinate systems. The first coordinate system starts at a top-left corner of the worktable 108, as shown by reference numeral 50. The second coordinate system starts at a center of the worktable 108, as shown by reference numeral 52. There could be infinite number of location choices for referencing the coordinate system. The purpose is merely to establish a reference framework to measure relative displacement. Therefore, the zero reference point need not be as shown at reference numerals 50 or 52. However, it should be noted that since the toolhead 106 can be displaced outside the perimeter of the worktable 108 as shown in FIG. 4, the frame of reference established by the locating fence need not be limited to be within the perimeter of the worktable 108. This feature of the present invention is especially useful in processing an extra large or an extra long workpiece.

Once the exact location of the locating fence 32 relative to the worktable 108 is known, the machining program can be executed as shown in step 308. Alternatively, determining the exact location of the locating fence as discussed in steps 302, 304 and 306 can be made a subpart of the machining program, in the form of subroutines, or any other arrangements known to a person of ordinary skill in the art. The machining program would then be able to learn of the exact position of the locating fence 32 from F(x,y,z). The machining program can then utilize the exact location of the locating fence 32 as a reference point to implement whatever predetermined work functions.

Figure 7:
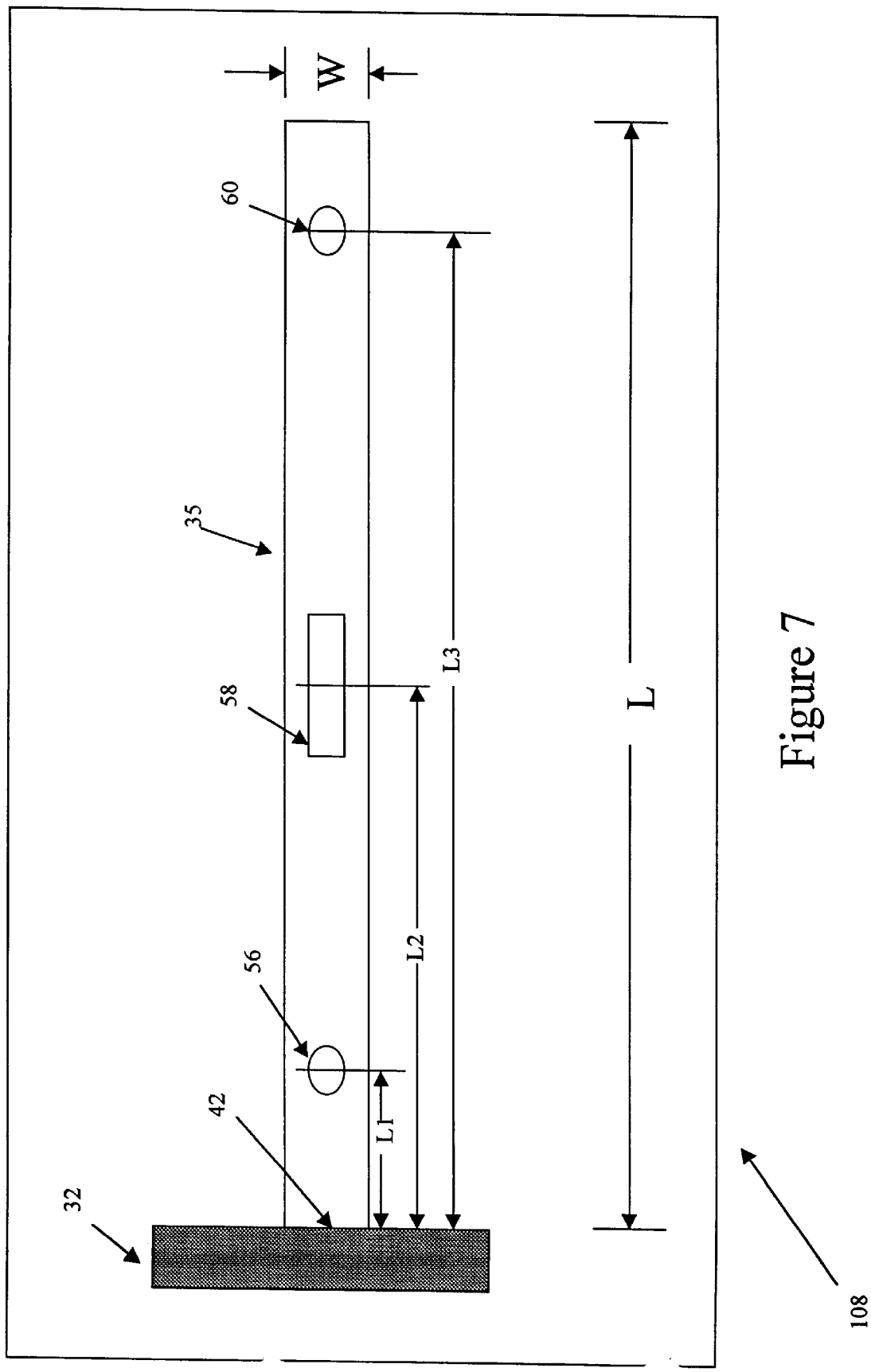
FIG. 7 illustrates a layout of machining operation.

FIG. 7 shows by way of an example a machining program. As shown, a workpiece 35 is placed on a worktable 108. The work functions to be performed includes creating an oval recess 56, a rectangular groove 58 and an oval recess 60. The specific dimensions of the workpiece 35, the grove and the oval recesses as well as their relative locations on the workpiece 35, and the sequence of machining are all pre-programmed into the machining program. Before execution of this machining program, the locating fence is placed adjacent to the workpiece 35 wherein the marking 42 is placed at the mid-section of the left edge of the workpiece 35. Exact placement of the locating fence relative to the workpiece can be arbitrarily selected as long as the location corresponds with the predetermined position of the machining program. Once the locating fence 32 and the marking 42 are correctly aligned with the predetermined location of the workpiece 35, the machining program is able to establish a reference framework to correctly create the proper oval recesses and the rectangular groove at the correct locations of the workpiece 35.

Applying this program to the embodiment shown in FIG. 1, the worktable 108 is displaced along the Y-axis via the feedscrew mechanisms 112 by a distance of L1 in-between the locating fence 32 and the toolbit 114 to create the oval recess 60. The rectangular groove 58 and the oval recess 56 are similarly created. The machining program is continuously executed until completion, as shown in steps 314 and 316.

Figure 8:
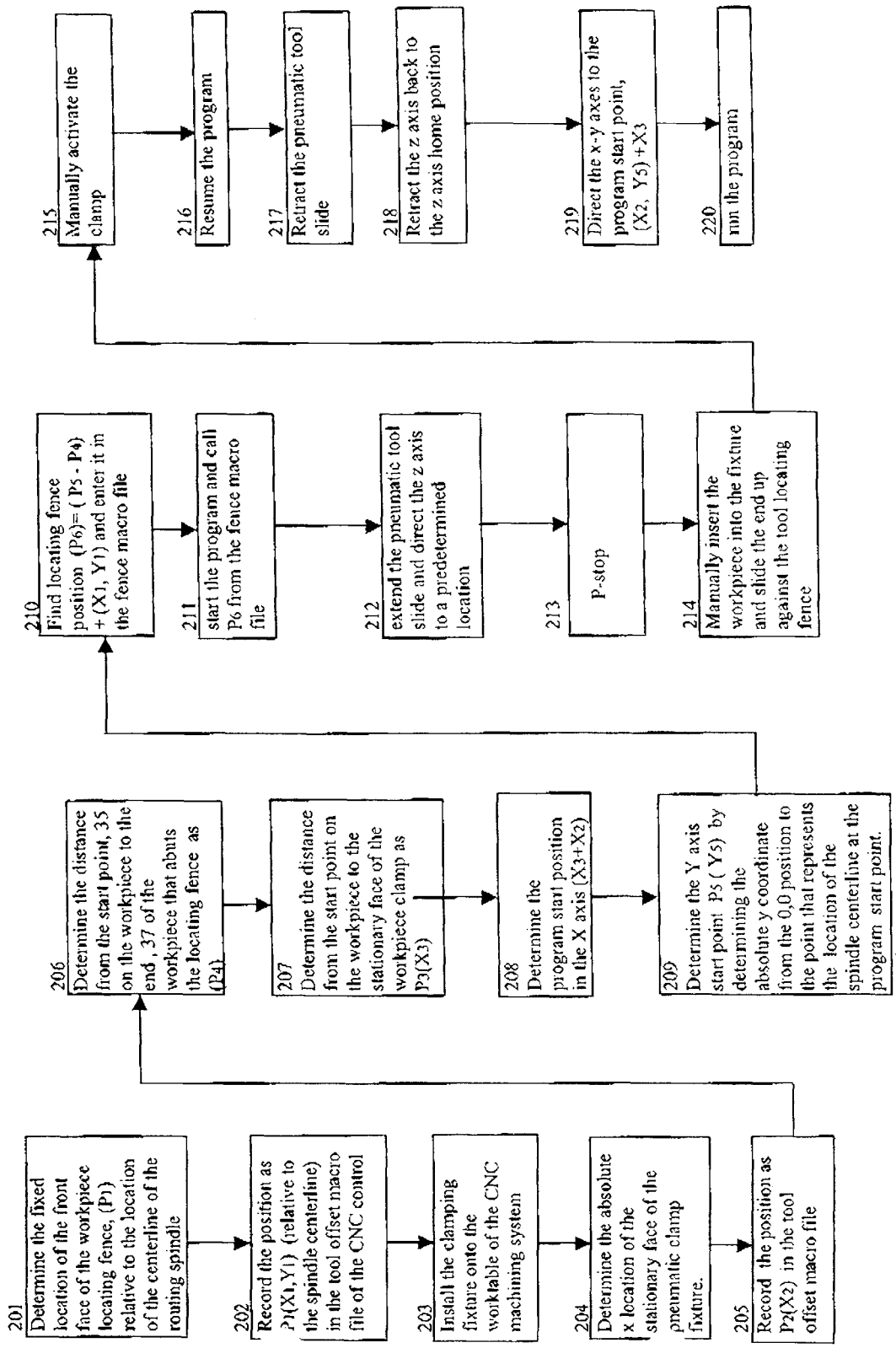
FIG. 8 illustrates a second flow chart for one embodiment of the present invention.

The following example in FIG. 8 describes a process used to integrate the programmable workpiece locating fence program into a workpiece-processing program. It is first necessary to define a distance between a centerline of a face of the fence and a centerline of the spindle as shown in step 201. This is necessary because in this example of the embodiment, the fence is not displaceable in the x or y direction, relative to the routing spindle, so the fixed distance must be taken into consideration when calculating the fence positioning data. This value is obtained by measuring with precision instruments, and is entered in the fence-offset file of the CNC control as $P_1$ $(X_1, y_1)$, as shown in step 202. The fence-offset file contains data significant to the position of individual indexing devices that are fixed relative to the centerline of the main spindle. This data will be automatically called and used later when the controller calculates the positioning data for the fence, based on the requirements for a specific program.

The clamping fixture 33, is affixed to the worktable, using bolts that run through the fixture bottom flange and attached to the worktable, as shown in step 203. Alternatively, it can also be attached to the worktable by vacuum. It is then necessary to measure the exact x location of the stationary face of the clamping fixture, and record it in the fence macro file as $P_2$ $(X_2)$, as shown in steps 204 and 205. The (Y) location of the clamp is variable, and is determined by the location of the programmable fence.

Figure 9:
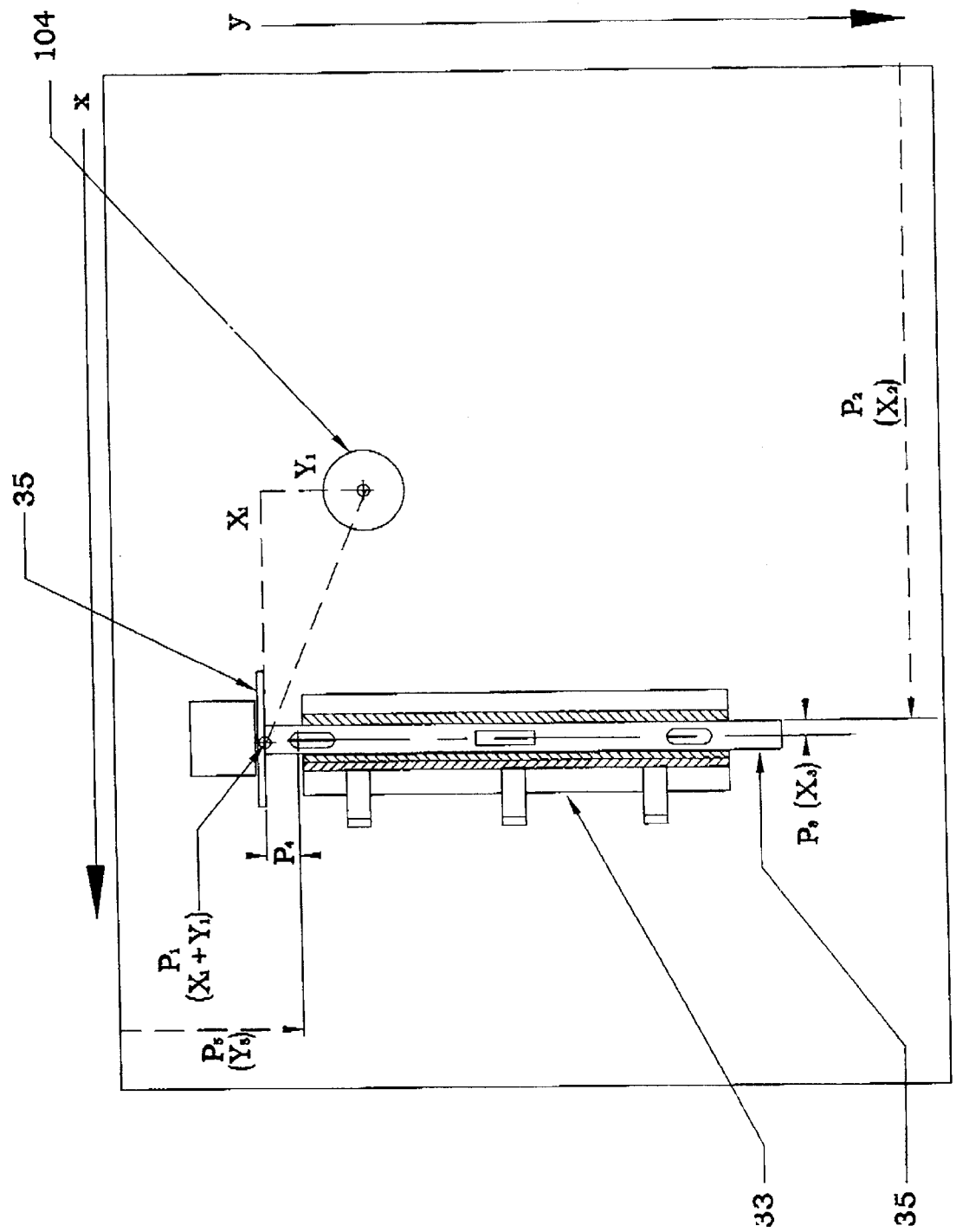
FIG. 9 illustrates a diagram corresponding to the second flow chart of FIG. 8.

After the preceding operations are completed, the x, y coordinate data for positioning the fence can be calculated and incorporated into the workpiece processing program. In order to know the exact x, y coordinate for the programmable fence, it is necessary to know the starting point of the program, relative to the side of the workpiece that abuts the clamp face, [$P_3 (X_3)$], and the end that will abut the fence itself, [$P_4 (Y_4)$], as shown in step 206. By adding the $P_3$ data to the $P_2$ data, $(X_3)+(X_2)$, the operator can calculate the start point in the x axis. The starting point in the y axis is calculated by determining an absolute y coordinate from the 0, 0 position that would place the centerline of the spindle at 2 to 3 inches from the end of the clamp, $P_5(Y_5)$. The $P_4$ data is subtracted from the aforementioned data and the $P_1$ macro is called and automatically subtracted. The result is the x, y positioning data for the locating fence. The flow chart labeled FIG. 8 in conjunction with a diagram shown FIG. 9 illustrates the above process in the order of each occurring event.

The z axis positioning data, along with the command to lower the pneumatic slide, is added to the program, and the program is entered and assigned a fence macro number. When the associated workpiece-processing program is invoked, the macro is called, and the calculations are automatically performed by the computer. The pneumatic slide is then activated and the program automatically pauses and prompts the operator to place the workpiece into the clamping fixture and abut it against the programmable fence. The operator then presses the resume switch on the controller and the program proceeds automatically.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of establishing a locating fence on a computer numerical controlled machine, comprising the steps of:
   installing a fence guard on a toolhead with a spindle to form the locating fence; and
   measuring a distance information between a calibration mark of the locating fence and a centerline of the spindle.

2. The method of claim 1, further comprising a step of:
   communicating the distance information with data provided by an indexing program tracking a displacement between the centerline of the spindle and a worktable.

3. The method of claim 2, further comprising a step of:
   obtaining a location information of the locating fence by incorporating the distance information with the data provided by the indexing program.

4. A computer numeric controlled (CNC) machine comprising:
   a worktable;
   a machine tool head movable relative to the worktable having a spindle;
   a fence having at least one reference offset a measured distance from a respective axis of the spindle; and
   a control operable to adjust a relative location of the spindle by the measured distance during a machine operation.

5. The CNC machine as described in claim 4 wherein the at least one reference is a flat surface.

6. The CNC machine as described in claim 4 wherein the at least one reference comprises linear markings.

7. The CNC machine as described in claim 4 wherein the fence comprises references corresponding to the x, y and z axes of the machine.

8. The CNC machine as described in claim 7 wherein each reference comprises a flat surface.

9. The CNC machine as described in claim 8 wherein each reference comprises linear markings located on a flat surface corresponding to one of the other references.

10. The CNC machine as described in claim 4 further comprising an actuator for retracting and extending the fence into an operable position.

11. The machine as described in claim 10 wherein the actuator is pneumatic or electric.

12. The CNC machine as described in claim 4 wherein the fence is removable from the CNC machine when not in use.

13. The CNC machine as described in claim 4 wherein the fence is attached to the toolhead.

14. The CNC machine as described in claim 13 wherein the fence is a blade guard for the spindle.

15. The machine as described in claim 4 wherein the fence is installed on one of x, y, and z axes.

16. A method for beginning a machining operation for a CNC machine having a spindle, a fence and a worktable, comprising the steps of:
   locating a work piece on the work table of the machine with respect to a reference on the fence; and
   calibrating an axis of the spindle with respect to the work piece based on a measured distance between the reference and the axis of the spindle.

17. The method according to claim 16 further including the step of:
   extending the fence into an operational position to locate the work piece and retracting the fence after the work piece is located on the work table.

18. The method according to claim 16 further including the step of:
   installing the fence on the machine to locate the work piece and removing the fence after locating the work piece on the work table.

19. The method according to claim 16 wherein the step of locating the work piece with respect to the reference includes sliding the work piece against a surface on the fence.

20. The method according to claim 16 wherein the step of locating the work piece with respect to the reference includes aligning the work piece with linear markings on a surface of the fence.

21. The method according to claim 16 further including the steps of:
   installing a clamping device on the work table of the machine;
   locating a stationary face with respect to a second reference on the fence; and
   calibrating a second axis of the spindle with respect to the stationary face based on a second measured distance between the second reference and the second axis of the spindle.

22. The method according to claim 21 further including the step of:
   clamping the work piece on the work table with the clamping device.

23. A method for beginning a machining operation for a CNC machine having a spindle, a fence and a worktable, comprising the steps of:
   locating a work piece on the work table of the machine with respect to a plurality of references on the fence; and
   calibrating axes of the spindle with respect to the work piece based on a measured distance between each reference and a respective axis of the spindle.

24. The method according to claim 23 wherein the step of locating the work piece with respect to the references includes sliding the work piece against at least one surface on the fence.

25. The method according to claim 23 wherein the step of locating the work piece with respect to the references includes aligning the work piece with at least one group of linear markings on a surface of the fence.

26. The method according to claim 23 wherein the step of locating the work piece with respect to the references includes sliding the work piece against a surface on the fence and aligning the work piece with a group of linear markings on the surface.

27. The method according to claim 23 further including the step of:

extending the fence into an operational position to locate the work piece and retracting the fence after the work piece is located on the work table.

28. A method for operating a CNC machine having a spindle, a work table, and a fence, comprising the steps of:

locating the worktable of the machine with respect to a plurality of references on the fence;

calibrating the axes of the spindle with respect to the worktable based on a measured distance between each reference and a respective axis of the spindle; and performing a machining operation on the worktable using a coordinate system based on the calibration of the spindle.

29. The method according to claim 28 wherein the step of locating the worktable with respect to the reference includes moving portions of the worktable against surfaces on the fence.

30. The method according to claim 29 wherein the step of locating the worktable with respect to the reference includes aligning portions of the worktable with groups of linear markings on the surfaces of the fence.

31. The method according to claim 28 wherein the step of locating the worktable with respect to the reference includes aligning portions of the worktable with groups of linear markings on the fence.

32. The method according to claim 28 further including the step of:

extending the fence into an operational position to locate the worktable and retracting the fence following the locating of the worktable.

33. The method according to claim 28 further including the step of:

installing the fence on the machine to locate the worktable and removing the fence following the locating of the worktable.

* * * * *